(12) United States Patent
Embutsu et al.

(10) Patent No.: US 11,733,584 B2
(45) Date of Patent: Aug. 22, 2023

(54) WAVELENGTH CONVERSION APPARATUS

(71) Applicant: Nippon Telegraph and Telephone Corporation, Tokyo (JP)

(72) Inventors: Koji Embutsu, Musashino (JP);
Nobutatsu Koshobu, Musashino (JP);
Ryoichi Kasahara, Musashino (JP);
Takeshi Umeki, Musashino (JP);
Osamu Tadanaga, Musashino (JP);
Takushi Kazama, Musashino (JP);
Takahiro Kashiwazaki, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/620,203

(22) PCT Filed: Jun. 20, 2019

(86) PCT No.: PCT/JP2019/024534
§ 371 (c)(1),
(2) Date: Dec. 17, 2021

(87) PCT Pub. No.: WO2020/255341
PCT Pub. Date: Dec. 24, 2020

(65) Prior Publication Data
US 2022/0244616 A1    Aug. 4, 2022

(51) Int. Cl.
*G02F 1/35*    (2006.01)
*G02F 1/377*    (2006.01)
*G02F 1/355*    (2006.01)

(52) U.S. Cl.
CPC .......... *G02F 1/3501* (2013.01); *G02F 1/3551* (2013.01); *G02F 1/377* (2013.01); *G02F 2202/22* (2013.01)

(58) Field of Classification Search
CPC ...... G02F 1/3501; G02F 1/3551; G02F 1/377; G02F 2202/22; H05F 3/00; H05F 3/04
See application file for complete search history.

(56) References Cited

U.S. PATENT DOCUMENTS

2020/0089079 A1* 3/2020 Ando .................. G02F 1/3501

FOREIGN PATENT DOCUMENTS

| CN | 202904405 U | * | 4/2013 | ............. G05D 23/24 |
|---|---|---|---|---|
| JP | H08-297264 A | | 11/1996 | |
| JP | 2001-119090 A | | 4/2001 | |
| JP | 3753236 B2 | | 12/2005 | |
| JP | 2008-9065 A | | 1/2008 | |

(Continued)

*Primary Examiner* — Daniel Petkovsek
(74) *Attorney, Agent, or Firm* — Workman Nydegger

(57) ABSTRACT

A wavelength conversion device that restrains output power of light when a temperature of a wavelength conversion element, including a ferroelectric substrate, is changed. The wavelength conversion device includes, in a casing, the wavelength conversion element, a temperature control element that controls a temperature of the wavelength conversion element, a static elimination mechanism, and a surface potential measurement mechanism, and eliminates static electricity by driving the static elimination mechanism when the surface potential measurement mechanism detects a change in surface potential of the wavelength conversion element.

7 Claims, 7 Drawing Sheets

(56) References Cited

FOREIGN PATENT DOCUMENTS

| | | | |
|---|---|---|---|
| JP | 2008-102228 A | 5/2008 | |
| JP | 2010-129547 A | 6/2010 | |
| JP | 2014-62960 A | 4/2014 | |
| JP | 2015-219421 A | 12/2015 | |
| WO | WO-2020105509 A1 * | 5/2020 | ........... G02F 1/3546 |

* cited by examiner

WAVELENGTH CONVERSION APPARATUS

TECHNICAL FIELD

The present invention relates to a wavelength conversion device that converts and outputs a wavelength of inputted light, and more particularly to a wavelength conversion device that generates light of a wavelength different from a wavelength of signal light when the signal light is inputted.

BACKGROUND ART

Conventionally, an optical waveguide used in a wavelength conversion device and using periodically poled lithium niobate (Periodically Poled Lithium Niobate, hereinafter referred to as PPLN) has been a wavelength conversion element capable of realizing increase in light intensity by being used as the optical waveguide and high wavelength conversion efficiency by using a quasi-phase-matched technology. Therefore, optical waveguides using PPLN attract attention as devices that play an important role in a next-generation optical fiber communication field and a field of quantum computing.

The optical waveguides using PPLN are used as a parametric amplification element configuring a phase sensitive amplifier (PAS) capable of low noise optical amplification and an excitation light generation element, and realize high-gain and low-noise optical amplification characteristics. Further, in the field of quantum computing, it is reported that by inserting an optical waveguide using PPLN into a fiber ring resonator and using it as a parametric oscillation element, high-capacity calculations are demonstrated at an extremely high speed as compared with the conventional calculators. In order to further improve the performance of these technologies, it is important to realize a wavelength conversion device having higher wavelength conversion efficiency.

FIG. 1 is a view illustrating a basic configuration of a conventional wavelength conversion device 10. In the wavelength conversion device 10 in FIG. 1, wavelength conversion that generates a difference frequency of signal light and control light by a quasi-phase-matched (Quasi-Phase-Matched, hereinafter referred to as QPM) technology (Patent Literature 1) is performed.

As illustrated in FIG. 1, in the conventional wavelength conversion device 10, signal light 1a with low light intensity and control light 1b with high light intensity are incident on a multiplexer 14 and are combined.

The signal light 1a combined with the control light 1b travels toward a wavelength conversion element 13, and is incident on one end of an optical waveguide core 11 that is disposed on a substrate 12 and has a periodically poled structure.

The signal light 1a is converted into difference frequency light 1c having a different wavelength from the signal light 1a by a nonlinear optical effect at a time of passing in the optical waveguide core 11, and is emitted from the other end of the optical waveguide core 11 with the control light 1b. The difference frequency light 1c and the control light 1b that are emitted from the optical waveguide core 11 are incident on a demultiplexer 15 and are separated from each other.

Further, there are also known several methods for producing an optical element (hereinafter, referred to as a wavelength conversion element) that performs wavelength conversion by using the quasi-phase-matched technology. For example, there is a method for producing a proton exchange waveguide by using a periodically poled structure after causing a crystal (hereinafter, referred to as a nonlinear optical crystal) substrate that exhibits a nonlinear optical effect to have the periodically poled structure. Further, for example, there is a method for producing a ridge optical waveguide by using a photolithography process and a dry etching process after causing a nonlinear optical crystal substrate to have a periodically poled structure similarly.

Patent Literature 1 discloses an example of producing the ridge optical waveguide, among these methods. Patent Literature 1 indicates that a wavelength conversion element is produced by bonding a first substrate of a nonlinear optical crystal having a periodically poled structure and a second substrate having a smaller refractive index than a refractive index of the first substrate, in order to improve a light confinement effect in the ridge optical waveguide. Further, Patent Literature 1 indicates that in order to avoid crack due to deterioration of an adhesive and a temperature change, a nonlinear optical crystal of the same type as the first substrate is used as the second substrate, and the first substrate and the second substrate are given heat to be diffusion-bonded.

A wavelength conversion device including a wavelength conversion element is practically used with the wavelength conversion element as well as the multiplexer and the demultiplexer housed in a metal casing including an input/output port capable of inputting and outputting light, so that characteristics are not deteriorated due to a change in a use environment. In particular, wavelength conversion efficiency of the wavelength conversion element has a temperature dependency, and in order to maximize the wavelength conversion efficiency, it is necessary to control a temperature of the wavelength conversion element. For this purpose, in the wavelength conversion device, a temperature control element is further housed inside the metal casing.

FIG. 2 is a perspective view illustrating a configuration example of a wavelength conversion device 20 further including a metal casing 29 and a temperature control element 26 in the configuration of the wavelength conversion device 10 in FIG. 1. The configuration of the wavelength conversion device illustrated in FIG. 2 includes the metal casing 29, the temperature control element 26, a support member 27, and a metal casing bottom surface member 28 in addition to the configuration illustrated in FIG. 1. The metal casing 29 includes an input port 200 and an output port 201 for inputting and outputting light, and inputting and outputting electric signals for temperature control, in side surfaces.

The support member 27 is a metal member for controlling a temperature of the entire wavelength conversion element 13 including the optical waveguide core 11 and the substrate 12 uniformly. The temperature control element 26 is interposed between the support member 27 and the metal casing bottom surface member 28. Note that the optical waveguide core 11, the substrate 12, the wavelength conversion element 13, the multiplexer 14, the demultiplexer 15, the signal light 1a, and the difference frequency light 1c are the same as those in the explanation of FIG. 1, and therefore explanation will be omitted.

Further, when a wavelength conversion element using a ferroelectric crystal material is used in the wavelength conversion device, a phenomenon called an optical damage occurs, in which a refractive index of the wavelength conversion element changes by irradiation of light having a short wavelength and characteristics decline. As a method for suppressing an influence by the optical damage, it is proposed to use the wavelength conversion element at a high temperature.

CITATION LIST

Patent Literature

Patent Literature 1: Japanese Patent No. 3753236

SUMMARY OF THE INVENTION

Technical Problem

In order to cause the wavelength conversion element to operate at a high temperature, a method of heating the wavelength conversion element by using a heat source such as a heater is conceivable. For example, in the wavelength conversion device 20 illustrated in FIG. 2, it is necessary to perform temperature control of the wavelength conversion element 13 at a high speed with high precision, and therefore a Peltier element is used as the temperature control element 26. When the temperature of the wavelength conversion element 13 is set at a high temperature by using a Peltier element, events described as follows become a problem.

Here, a Peltier element is a thermoelectric element that uses a so-called Peltier effect in which heat is transferred from one metal to the other metal when an electric current is passed through the junction of two types of metals. Consequently, when an electric current is passed through a Peltier element, heat absorption occurs on one surface with the junction surface sandwiched between the one surface and the other surface, and heat generation occurs on the other surface at the same time.

Therefore, when the temperature of the wavelength conversion element 13 is set at a higher temperature than an ambient temperature of the wavelength conversion element 13, it is assumed that condensation dew occurs on a heat absorption side under an atmospheric environment. When water generated by dew condensation stays inside the Peltier element and in a vicinity of a lead wire electrode, solder that joins the Peltier element and the lead wire electrode is corroded by water, and the Peltier element and the lead wire electrode may be electrically disconnected and damaged.

Further, it is also assumed that when the water generated by dew condensation contacts a plurality of electrodes, solder components repeat anode elution and cathode precipitation via water due to a potential difference among the electrodes, as a result of which, the plurality of electrodes are short-circuited and the wavelength conversion element 13 fails. Therefore, in order to realize the wavelength conversion device 20 with high reliability, it is necessary to hermetically seal the wavelength conversion device 20 in a dry gas atmosphere containing no water.

However, when the wavelength conversion device 20 is hermetically sealed in the dry gas atmosphere, another problem occurs. In other words, no atmospheric ion exists in the wavelength conversion device 20 when the wavelength conversion device 20 is hermetically sealed in the dry gas atmosphere, and therefore it is not possible to neutralize surface charges on the substrate 12, which occur on the surface of the substrate 12 that is a ferroelectric due to a pyroelectric effect when the temperature of the wavelength conversion element 13 is changed.

That is to say, the non-linear optical crystal used in the substrate 12 is a ferroelectric and is polarized. The monopolarized ferroelectric substrate has a large pyroelectric effect, and the density of the surface charges changes with temperature change. The charges diffuse in the crystal, form an electric field distribution, and bring about a refractive index change by a Pockels effect. As a result, a phase matching wavelength of the wavelength conversion element 13 changes, and there arises the problem that the output power of the wavelength conversion light such as SHG light is reduced. Atmospheric ions neutralize the surface charges under an atmospheric environment, but the problem of dew condensation occurs as described above.

When there are surface charges like this, a change occurs in the refractive index distribution of the substrate 12. Further, change in surface charges on the substrate 12 due to the pyroelectric effect also affects the inside of the optical waveguide core 11 and generates an ununiform distribution in a charge density in the inside of the optical waveguide core 11. Therefore, an ununiform refractive index distribution also occurs to the inside of the optical waveguide core 11, as a result of which, there has been a problem that a wavelength satisfying the phase matching condition changes in the optical waveguide core 11, and output power of the difference frequency light 1c which is subjected to wavelength conversion declines.

Means for Solving the Problem

The present invention is made to solve the above described problem.

One embodiment of the present invention is a wavelength conversion device that generates light with a different wavelength from a wavelength of signal light when the signal light is inputted, and includes a wavelength conversion element that converts the wavelength of the signal light, and a temperature control element for controlling a temperature of the wavelength conversion element.

Here, the wavelength conversion element and the temperature control element are sealed in an inside of a metal casing, and the inside of the metal casing is filled with dry gas including one or more selected from nitrogen, oxygen, argon or helium, the wavelength conversion element includes an optical waveguide core and a substrate having a lower refraction index to the signal light than the optical waveguide core, and the optical waveguide core and the substrate are ferroelectrics.

In the present invention, the wavelength conversion device is realized, which includes, inside the metal casing, a surface potential measurement mechanism that measures a surface potential of the wavelength conversion element and a static elimination mechanism that reduces a change in surface potential, further includes a control mechanism that causes a suppression mechanism for the surface potential to function automatically when the surface potential is regularly measured and a change amount exceeds a specified allowable value, thereby makes it possible to suppress refraction index change of the wavelength conversion element by keeping the surface charge density of the wavelength conversion element within a constant range, and can be stably operated without a variation in phase matching curve.

One embodiment of the present invention includes the following configurations.

(Configuration 1)

A wavelength conversion device that generates light that is different in wavelength from signal light when the signal light is inputted, including a wavelength conversion element that converts a wavelength of the signal light, and a temperature control element for controlling a temperature of the wavelength conversion element, wherein
the wavelength conversion element and the temperature control element are sealed in an inside of a metal casing, and
the inside of the metal casing is filled with dry gas including one or more selected from nitrogen, oxygen, argon or helium,
the wavelength conversion element includes an optical waveguide core and a substrate having a lower refractive index to the signal light than the optical waveguide core, and
a static elimination mechanism is included inside the metal casing.

(Configuration 2)

The wavelength conversion device described in configuration 1, including, inside the metal casing, a surface potential measurement mechanism that measures a surface potential of the wavelength conversion element.

(Configuration 3)

The wavelength conversion device described in configuration 2, including a control mechanism that causes the static elimination mechanism to operate based on a change amount of a surface potential of a wavelength conversion element measured by the surface potential measurement mechanism.

(Configuration 4)

The wavelength conversion device described in any one of configurations 1 to 3, further including a multiplexer that combines the signal light and control light, and
a demultiplexer that separates the signal light that has a wavelength converted by the wavelength conversion element and the control light.

(Configuration 5)

The wavelength conversion device described in any one of configurations 1 to 4, wherein
the temperature control element is a Peltier element,
the Peltier element is interposed between a first surface of a support member and a metal casing bottom surface member disposed on a bottom surface of the metal casing, and the wavelength conversion element is placed on a second surface of
the support member, the second surface facing the first surface of the support member.

(Configuration 6)

The wavelength conversion device according to any one of configurations 1 to 5, wherein
the substrate is LiNbO3 (lithium niobate), KNbO3 (potassium niobate), LiTaO3 (lithium tantalate), LiNb(x)Ta(1−x)O3 (0≤x≤1) (lithium tantalate of a nonstoichiometric composition), or KTiOPO4 (potassium titanate phosphate), and further includes at least one selected from Mg (magnesium), Zn (zinc), Sc (scandium), or In (indium) therein as an additive.

(Configuration 7)

The wavelength conversion device according to any one of configurations 1 to 6, wherein
the static elimination mechanism is an electrode needle to which a high voltage is applied or a UV-LED that irradiates the wavelength conversion element with ultraviolet light.

(Configuration 8)

The wavelength conversion device according to configuration 2 or 3, wherein
the surface potential measurement mechanism detects a voltage that is generated across a vibration electrode connected to a crystal oscillator, and a detection electrode disposed to face the vibration electrode, and measures a surface potential of the wavelength conversion element.

Effects of the Invention

According to the present invention, it is possible to provide the wavelength conversion device capable of suppressing reduction in the output power of the wavelength conversion light, which occurs due to a pyroelectric effect of the ferroelectric substrate when the temperature of the wavelength conversion element is changed.

DESCRIPTION OF EMBODIMENTS

Hereinafter, embodiments of the present invention will be described in detail with reference to the drawings. An operation principle of a wavelength conversion device of one embodiment of the present invention will be described. The wavelength conversion device of one embodiment of the present invention uses a ferroelectric crystal as a substrate that is a lower portion of a ridge optical waveguide of a wavelength conversion element.

Embodiment 1

Figure 1:
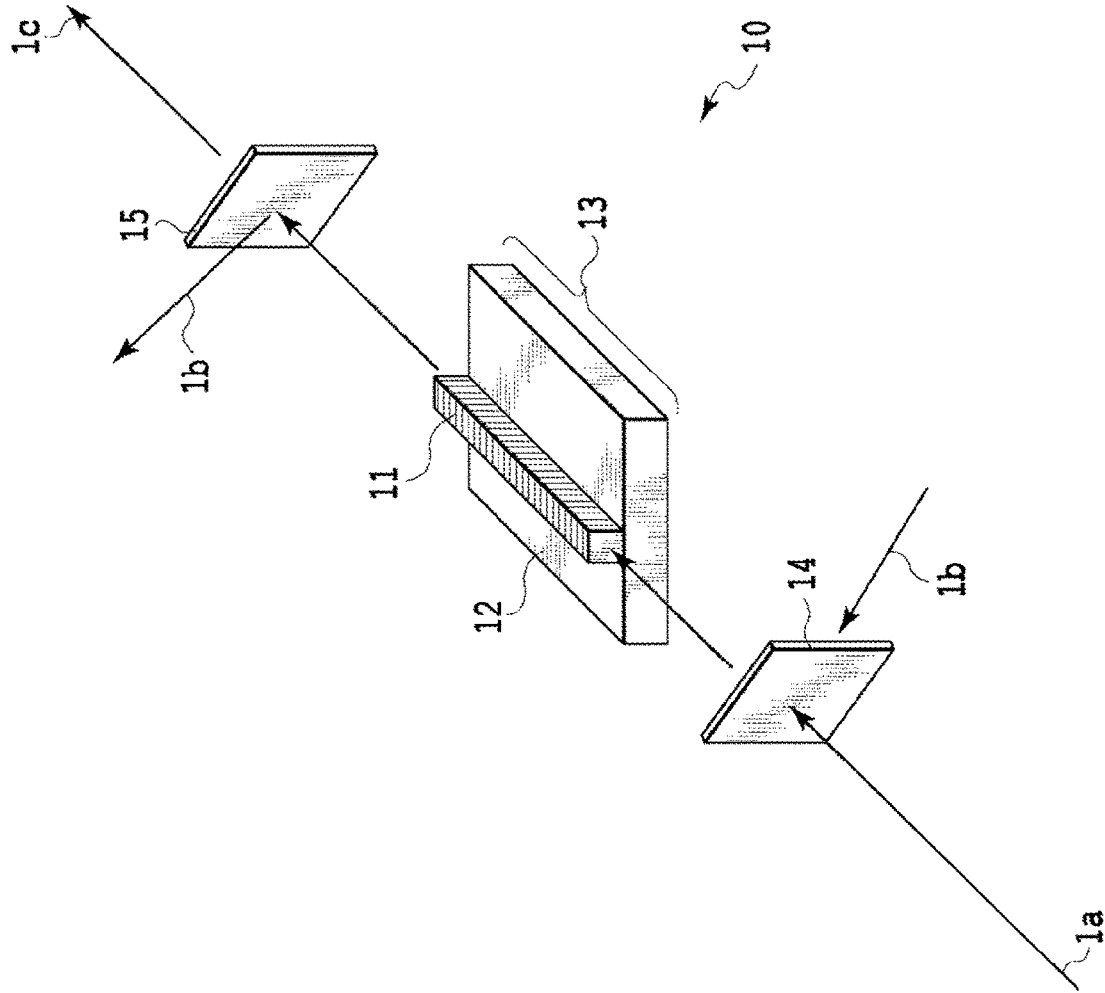
FIG. 1 is a view illustrating a basic configuration example of a conventional wavelength conversion device 10 that generates a difference frequency by a quasi-phase-matched technology.
Figure 2:
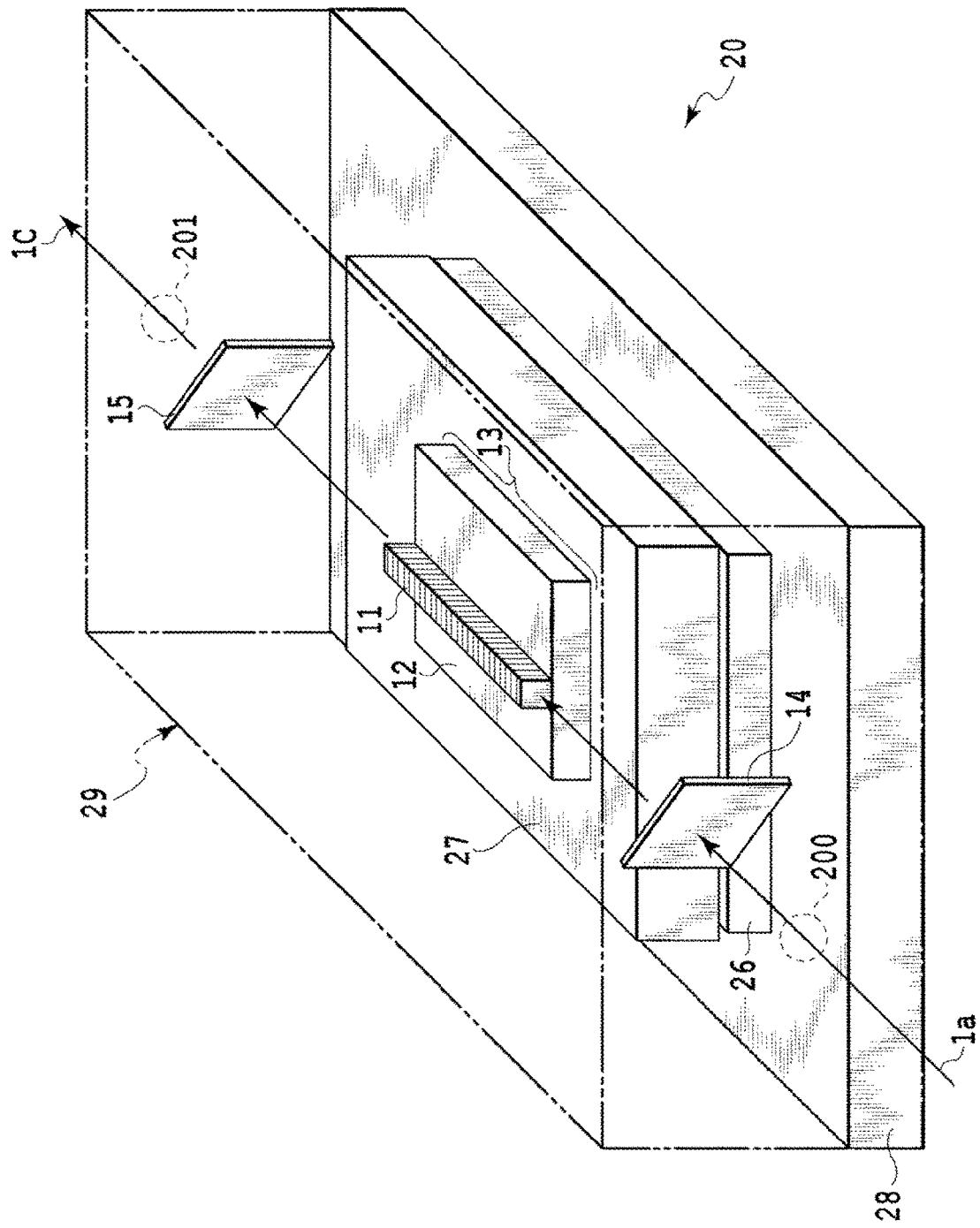
FIG. 2 is a perspective view illustrating a configuration example of the conventional wavelength conversion device.
Figure 3:
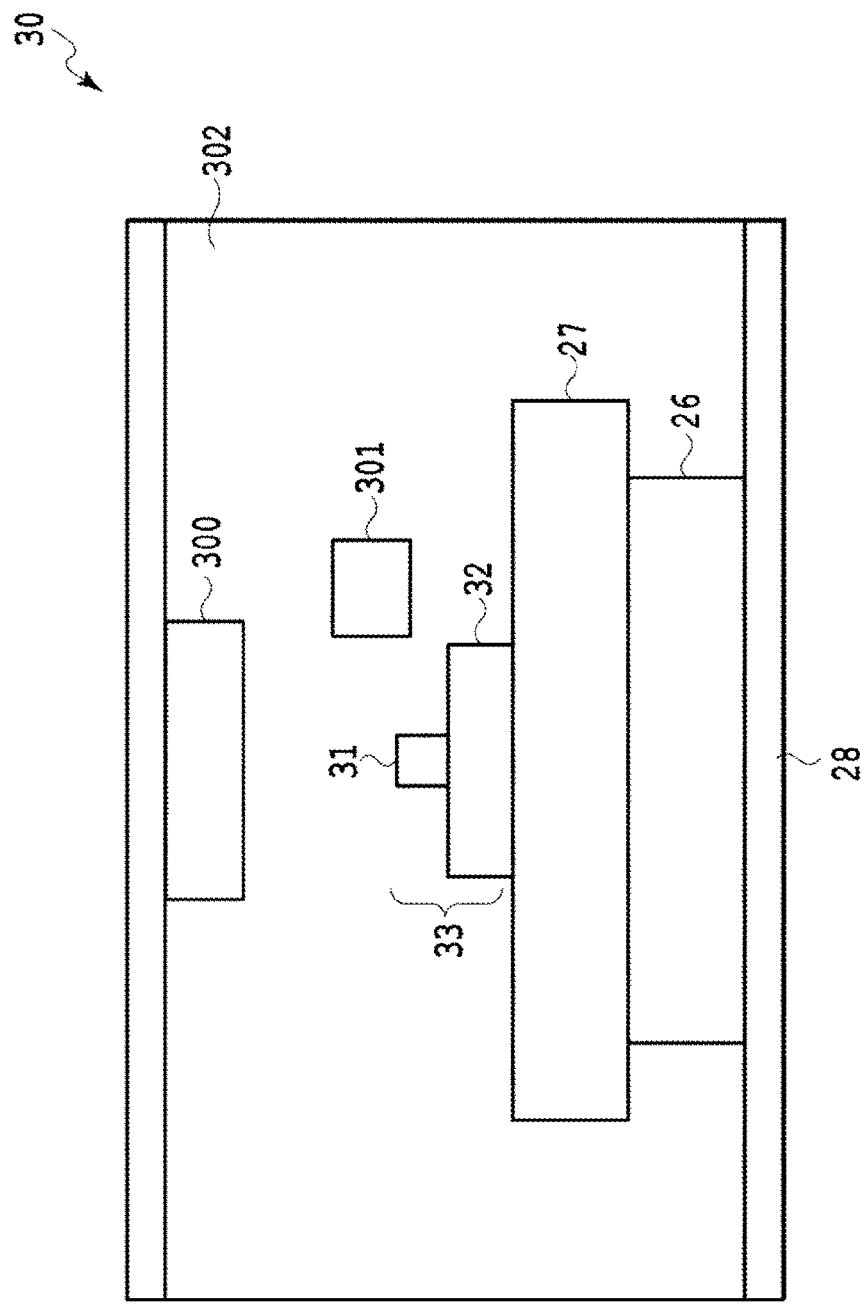
FIG. 3 is a sectional view illustrating a configuration of a wavelength conversion device of the present invention.

FIG. 3 is a view illustrating a sectional configuration of a wavelength conversion device 30 that is one embodiment of the present invention. The wavelength conversion device 30 is such a wavelength conversion device that when a fundamental wave with a wavelength of 1550 nm is inputted as signal light from a front side of the drawing, for example, signal light with a wavelength converted that is a second harmonic wave thereof and has a wavelength (775 nm) is outputted toward a back surface side of the drawing.

The wavelength conversion device 30 of embodiment 1 in FIG. 3 includes a multiplexer (not illustrated), a wavelength conversion element 33, and a demultiplexer (not illustrated). The multiplexer combines signal light and control light similarly to the conventional device. The aforementioned wavelength conversion element 33 includes an optical waveguide core 31 and a substrate 32. The aforementioned demultiplexer separates the signal light with a wavelength converted and the control light. A metal casing is included to seal these elements, and inside the metal casing, a temperature control element 26, and a support member 27 are further included, a top surface of the temperature control element is connected to the support member 27, an under-surface is connected to a bottom surface member 28 of the metal casing, and the wavelength conversion element 33 including the optical waveguide core 31 and the substrate 32 is placed on the support member 27.

The metal casing further includes an input port and an output port for inputting and outputting light, in side surfaces (in the sectional view in FIG. 3, the front side of the drawing and the back surface side of the drawing), and includes terminals for inputting and outputting electric signals in different side surfaces (in the sectional view in FIG. 3, side surfaces on the left and right of the drawing) from the side surfaces for inputting and outputting light, though not illustrated.

The optical waveguide core 31 is an optical waveguide that allows signal light to pass through an inside thereof selectively without losing intensity of the signal light. A structure of the optical waveguide core 31 is not specially limited as long as the optical waveguide core has a function of outputting signal light with a wavelength converted, which has a different wavelength from the signal light when the signal light is inputted. The structure of the optical waveguide core 31 can be a structure in which a quadric nonlinear constant changes along a traveling direction of light periodically or at a period to which a predetermined modulation is given, and quasi-phase matching for a single wavelength or a plurality of wavelengths is realized, and a multi QPM element can be adopted, for example.

The substrate 32 is a substrate that is a ferroelectric, and is transparent to the signal light, that is, does not cause light absorption. The substrate 32 is caused to function as an underclad to the optical waveguide core 31 when configuring the ridge optical waveguide, and needs to have a lower refractive index to signal light, control light, and signal light with the wavelength converted, than the optical waveguide core 31.

The ferroelectric material adopted for the substrate 32 is LiNbO3, KNbO3 (potassium niobate), LiTaO3 (lithium tantalate), LiNb$_{(x)}$Ta$_{(1-x)}$O3 (0≤x≤1) (lithium tantalate of a nonstoichiometric composition), or KTiOPO4 (potassium titanate phosphate), and preferably further includes at least one selected from Mg (magnesium), Zn (zinc), Sc (scandium) and In (indium) as an additive therein.

The metal casing is a metal casing that joins the top surface member and the bottom surface member with the side surface members and seals an inside so as to keep the inside airtight.

The support member 27 is not only a mechanical support member but also, for example, a metal member for heat conduction that keeps a temperature of the entire wavelength conversion element 33 including the optical waveguide core 31 and the substrate 32 uniform.

The temperature control element 26 is interposed between the support member 27 and the metal casing bottom surface member 28. The temperature control element 26 is a thermoelectric element like a Peltier element, for example. Further, in order to efficiently exhibit the heat generation and heat absorption effects between the support member 27 and the metal casing bottom surface member 28, the temperature control element can adopt solder joining with high heat conductivity, joining by a conductive adhesive, or other known joining methods, as a joining method.

Dry gas 302 is gas that fills an inside of the metal casing and includes no water. In other words, as illustrated in FIG. 3, the dry gas 302 is an atmosphere around the wavelength conversion element 33, the temperature control element 26, the support member 27 and the metal casing bottom surface member 28 that are sealed in the metal casing.

The dry gas 302 preferably includes one kind or more selected from nitrogen, oxygen, argon or helium. In the present embodiment, dry nitrogen gas is used as the dry gas 302.

In the wavelength conversion device 30 of the present embodiment 1, in order to avoid characteristic instability due to the pyroelectric effect of the substrate 32 of the wavelength conversion element 33, the ferroelectric substrate 32 is used as a lower portion of the ridge optical waveguide in the metal casing, and the optical waveguide core 31 by PPLN, of 5 μm square is formed on the substrate 32 by dry etching.

The wavelength conversion element 33 produced as above is fixed onto the support member 27, and the support member 27 and the metal casing bottom surface member 28 between which the temperature control element 26 is interposed are fixed to and housed inside the metal casing in a state where the top surface is opened.

In the wavelength conversion device 30 of embodiment 1 of the present invention in FIG. 3, a static elimination mechanism 301 is placed in a vicinity of the wavelength conversion element 33, and a surface potential measurement mechanism 300 is installed directly above the wavelength conversion element 33. For example, the static elimination mechanism 301 may be fixed to an inside of the side surface of the metal casing, and the surface potential measurement mechanism 300 may be fixed to an inside of a ceiling member of the metal casing. When the surface potential measurement mechanism 300 detects a change in surface potential of the wavelength conversion element 33, it is possible to drive the static elimination mechanism 301 to eliminate surface charges of the wavelength conversion element 33, and suppress a characteristic change of the wavelength conversion element 33.

Figure 5:
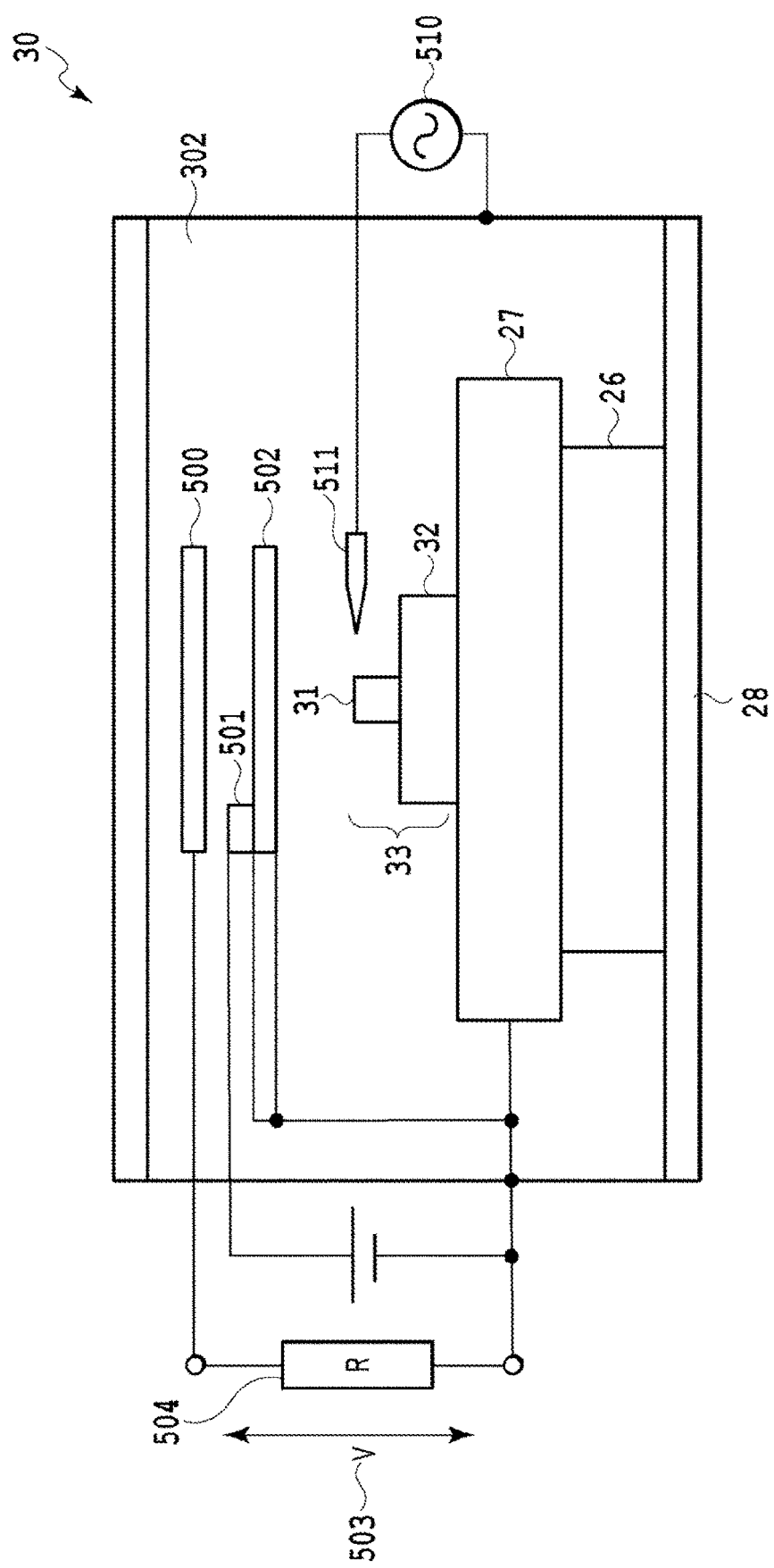
FIG. 5 is a view illustrating one example of a first embodiment of the present invention.

As in the wavelength conversion device 30 of one example of embodiment 1 in FIG. 5, as the static elimination mechanism 301, for example, a needle-shaped electrode 511 to which a high voltage is applied can be installed inside the casing. It is possible to suppress deterioration of the characteristics and instability by applying a high voltage to the electrode needle 511 by the high-voltage power supply 510 connected to the metal casing, ionizing the dry gas with a tip end portion of the electrode needle 511 to neutralize the surface charges of the wavelength conversion element 33, and reducing the change of the surface potential of the wavelength conversion element 33.

Further, it is possible to configure the surface potential measurement mechanism 300 by, for example, a detection electrode 500, a crystal oscillator 501, and a vibration electrode 502, in FIG. 5. It is possible to measure the surface potential of the wavelength conversion element 33 by detecting a voltage that occurs across the vibration electrode 502 connected to the crystal oscillator 501 that is driven by an oscillator, and the detection electrode 500 that is disposed to oppose the vibration electrode 502 as a detection voltage 503, in both ends of a detection resistor 504.

A change in charge that is induced in the electrode is detected and measured as the detection voltage 503 (V) in both the ends of the detection resistor 504 (R) by installing the vibration electrode 502 attached to the crystal oscillator 501 driven by an oscillator between the wavelength conversion element 33 and the detection electrode 500, vibrating the vibration electrode 502 in front of the detection electrode 500, and changing a number of lines of electric force passing from the wavelength conversion element 33 to the detection electrode 500.

Returning to FIG. 3, when the surface potential measurement mechanism 300 detects the change in surface potential of the wavelength conversion element 33, a control mechanism not illustrated drives the static elimination mechanism 301 to eliminate the surface charges of the wavelength conversion element 33 to eliminate static electricity, and thereby the characteristic change of the wavelength conversion element 33 is remarkably suppressed.

When the surface potential is regularly measured, and a change amount exceeds a specified allowable value, it is also possible to keep the surface charge density of the wavelength conversion element within a constant range for a long period by the control mechanism that causes the static elimination mechanism 301 to function automatically as a suppression mechanism for the surface potential.

As a production step of the wavelength conversion device, the temperature control element 26, the support member 27, and the wavelength conversion element 33 including the optical waveguide core 31 and the substrate 32 are placed in this order on the bottom surface member 28 inside the metal casing, and after the static elimination mechanism 301 and the surface potential measurement mechanism 300 are installed in the casing, the top surface (ceiling) and the bottom surface and the four side surfaces of the metal casing are seam-welded in the atmosphere of the dry nitrogen gas 302, and thereby hermetical sealing of the metal casing is performed.

In the wavelength conversion device 30 that is produced, the wavelength conversion element is set at 45° C. that is an operation temperature, and a phase matching curve is investigated.

Figure 4:
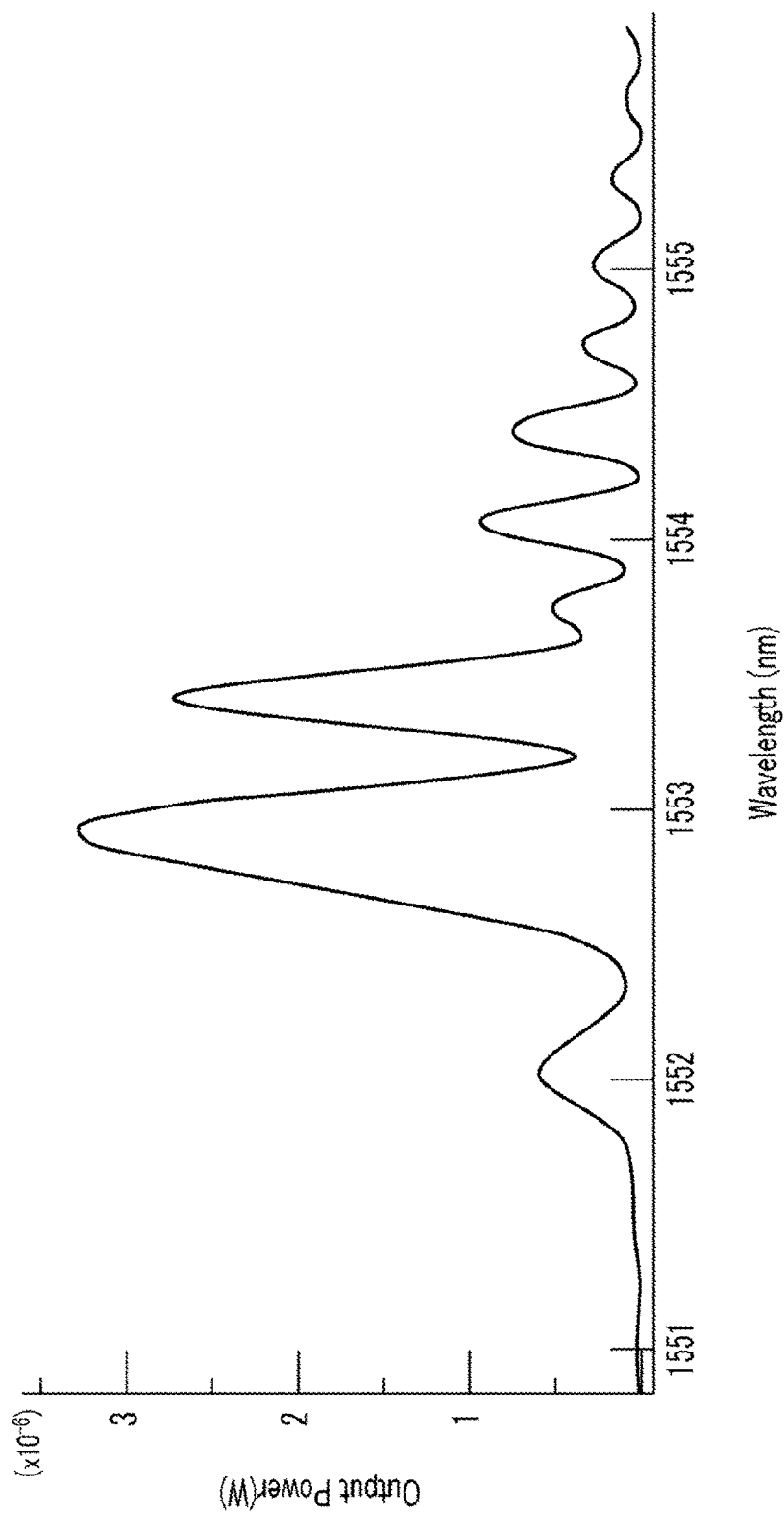
FIG. 4 is a graph showing a phase matching characteristic of the conventional wavelength conversion device.
Figure 6:
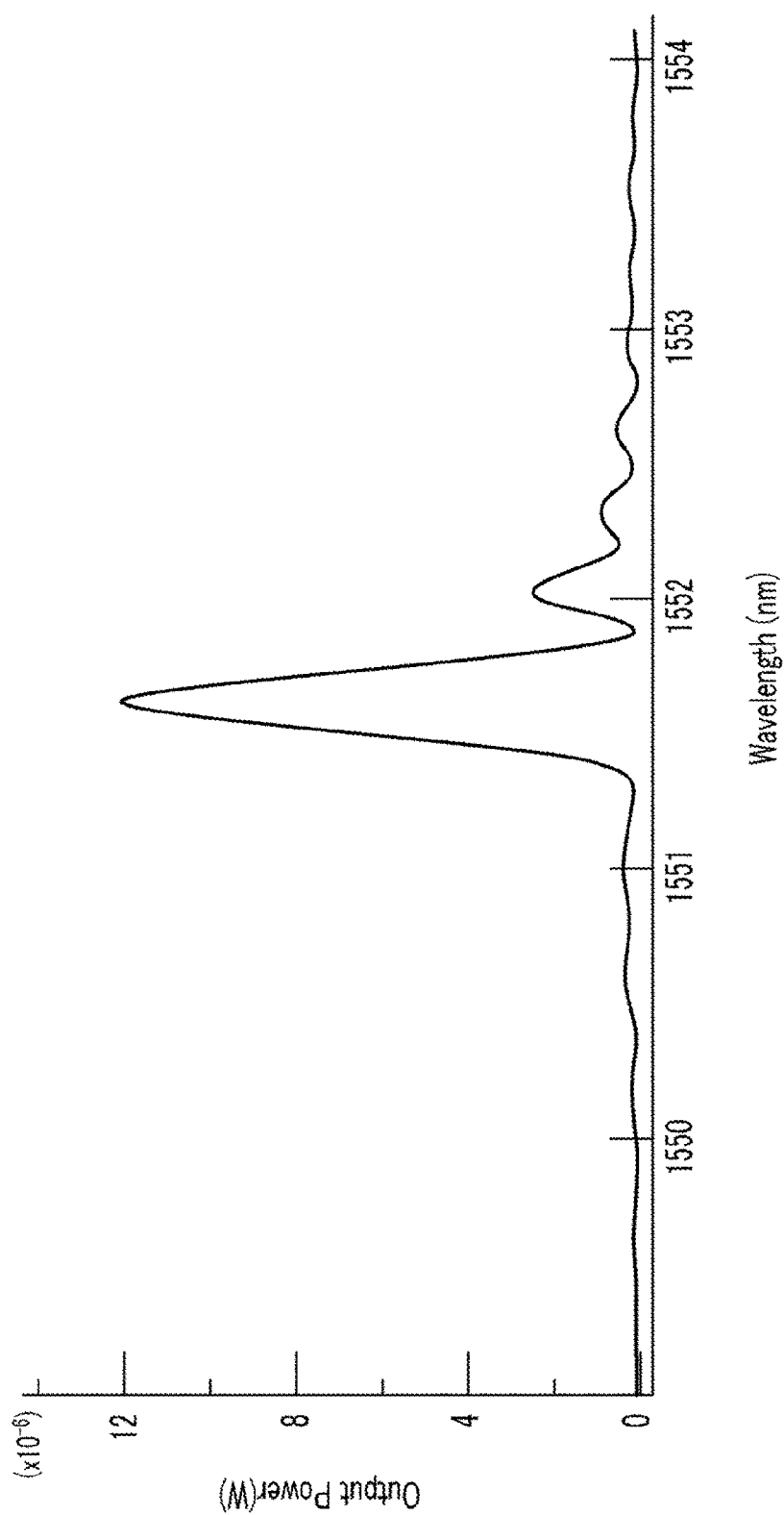
FIG. 6 is a graph showing a phase matching characteristic in the first embodiment of the present invention.

FIG. 4 and FIG. 6 are respectively graphs that are shown to compare the phase matching characteristics of a case where the static elimination mechanism of the prior art is not operated (FIG. 4), and a case where the static elimination mechanism is operated by applying a high voltage of ±3 kV to the electrode needle 511 of embodiment 1 of the present invention (FIG. 6).

In each of the graphs in FIG. 4 and FIG. 6, a horizontal axis represents a wavelength (Wavelength (nm)) of signal light with the wavelength converted that is outputted from the wavelength conversion device, and a vertical axis represents light output power (Output Power (W)) thereof.

In the graph in FIG. 4 of the prior art, it is known that the phase matching condition is not partially satisfied in the wavelength conversion element due to the refraction index change due to the pyroelectricity of the substrate of the wavelength conversion element, and significantly deviates from a characteristic expressed by a Sin c function (sin(x)/x) that is a theoretical phase matching curve, and the wavelength conversion efficiency is reduced.

On the other hand, when the static elimination mechanism 301 is caused to function in the wavelength conversion element 30 of the embodiment of the present invention in FIG. 3 or 5, corona discharge occurs at the tip end portion of the electrode needle 511 by applying a high voltage of ±3 kV to the electrode needle 511, nitrogen gas is ionized to neutralize the surface charge of the wavelength conversion element 33, and an influence of the refraction index change due to the pyroelectric effect is significantly reduced. Therefore, as illustrated in FIG. 6, it is known that the influence of the pyroelectric effect is suppressed more favorably, the shape of the phase matching curve is close to an ideal Sin c function, and high wavelength conversion efficiency is able to be obtained.

In the surface potential measurement mechanism 300 of the present embodiment in FIGS. 3 and 5, the amount of charges induced to the detection electrode 500 by the pyroelectric effect that occurs to the wavelength conversion element 33 is measured. This causes the metal plate of the vibration electrode 502 attached to the crystal oscillator 501 to vibrate in front of the detection electrode 500, and changes the number of lines of electric force that pass from the wavelength conversion element 33 to the detection electrode 500. Thereby, the change in charge that is induced in the detection electrode 500 can be measured as the detection voltage 503 (V) that appears at both the ends of the detection resistor 504 (R), and can be grasped as the change amount of the surface potential.

Further, when the measured potential change amount becomes ±10% or more, control of driving the static elimination mechanism 301 is performed by the control mechanism, and it is possible to maintain high wavelength conversion efficiency without the phase matching curve of the wavelength conversion device changing for about half a year.

Embodiment 2

Figure 7:
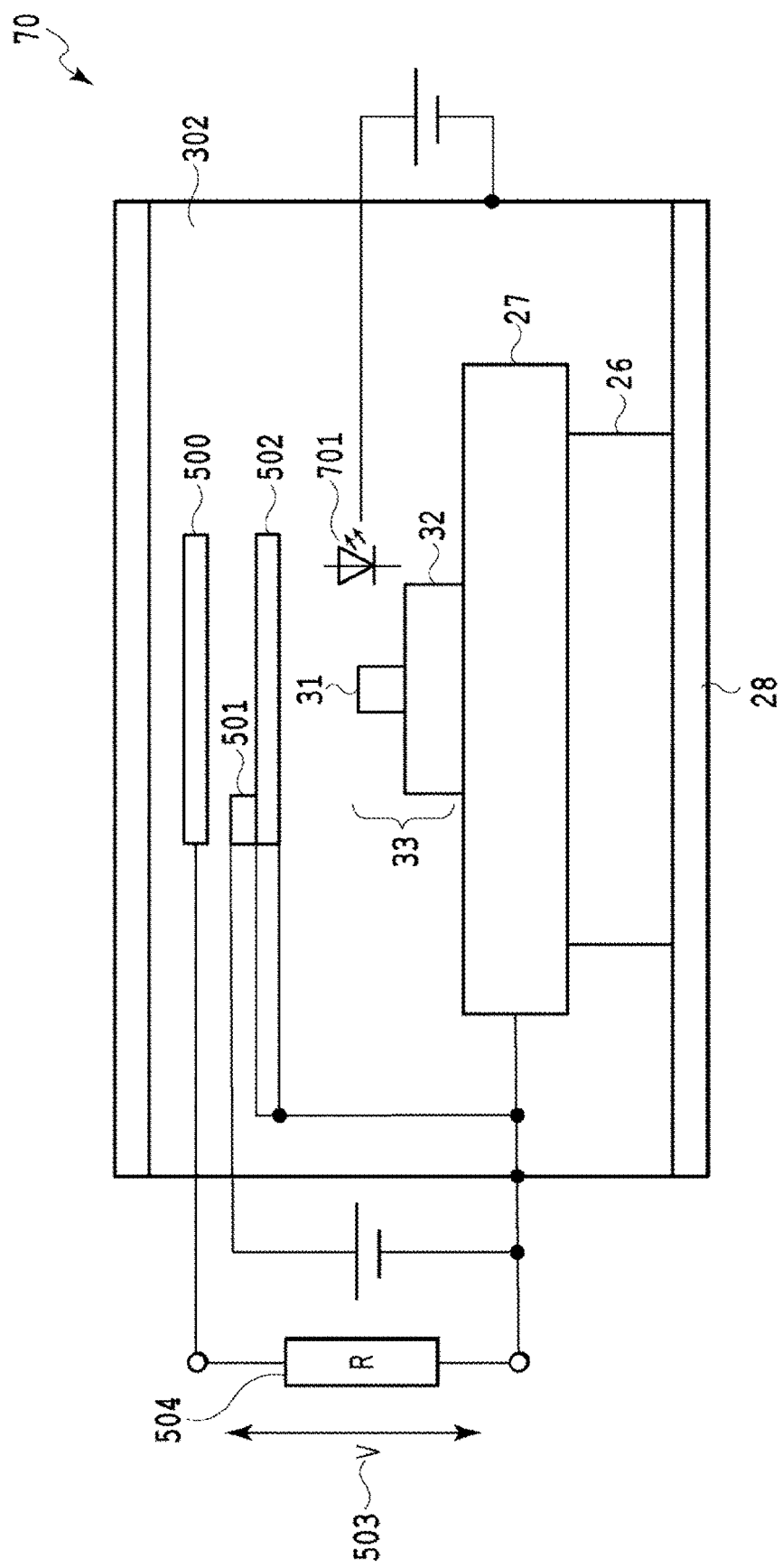
FIG. 7 is a view illustrating a second embodiment of the present invention.

FIG. 7 illustrates a wavelength conversion device 70 in a second embodiment of the present invention. In the present embodiment 2, components other than a static elimination mechanism 701 and an optical waveguide core 31 are same as those in embodiment 1 in FIGS. 3 and 5.

A difference of embodiment 2 from embodiment 1 is that the static elimination mechanism 301 of embodiment 1 has a structure that eliminates static electricity by ionizing nitrogen gas by corona discharge that is generated at the tip end of the electrode needle 511, whereas in the present embodiment 2 in FIG. 7, surface charges of the wavelength conversion element 33 are neutralized by directly irradiating the wavelength conversion element with ultraviolet light by using a UV-LED (ultraviolet LED), and an influence of the refraction index change due to the pyroelectric effect is reduced. Use of the UV-LED (ultraviolet LED) provides an advantage that a high-voltage power supply does not have to be used. In the present embodiment 2, in order to reduce optical damage by irradiation with ultraviolet light, $LiNbO_3$ that is increased in light damage resistance by being doped with ZnO is used to the optical waveguide core 31.

In the present embodiment 2 in FIG. 7, a compact UV-LED is installed in a casing as a light source of ultraviolet light. It has been confirmed that according to the present embodiment, an influence of the pyroelectric effect is more favorably suppressed as in the case of embodiment 1, a shape of a phase matching curve of the wavelength conversion device is close to an ideal Sin c function, and high wavelength conversion efficiency can be obtained.

INDUSTRIAL APPLICABILITY

As above, the wavelength conversion device of the present invention includes, inside the metal casing, the surface potential measurement mechanism that measures the surface potential of the wave length conversion element and the static elimination mechanism that reduces the change in surface potential, and includes the control mechanism that drives the static elimination mechanism in response to the measurement value of the surface potential, whereby it is made possible to keep the surface charge density of the wavelength conversion element within a constant range to suppress the refraction index change of the wavelength conversion element, and it becomes possible to operate stably without a variation in the phase matching curve.

REFERENCE SIGNS LIST

1a Signal light
1b Control light
1c Difference frequency light
10, 20, 30, 70 Wavelength conversion device
11, 31 Optical waveguide core
12, 32 Substrate
13, 33 Wavelength conversion element
14 Multiplexer
15 Demultiplexer
26 Temperature control element
27 Support member
28 Metal casing bottom surface member
29 Metal casing
200 Input port
201 Output port
300 Surface potential measurement mechanism
301 Static elimination mechanism
302 Dry gas
500 Detection electrode
501 Crystal oscillator
502 Vibration electrode
503 Detection voltage
504 Load resistor
510 High voltage power supply
511 Electrode needle
701 Ultraviolet LED (UV-LED)

The invention claimed is:

1. A wavelength conversion device that generates light that is different in wavelength from inputted signal light, comprising:

a wavelength conversion element that converts a wavelength of the inputted signal light; and a temperature control element for controlling a temperature of the wavelength conversion element, wherein the wavelength conversion element and the temperature control element are sealed in an interior of a metal casing, and the interior of the metal casing is filled with a dry gas including one or more selected from nitrogen, oxygen, argon, or helium, the wavelength conversion element includes an optical waveguide core and a substrate having a lower refractive index than the optical waveguide core, a static elimination mechanism is included inside the metal casing, and a surface potential measurement mechanism in the interior of the metal casing that measures a surface potential of the wavelength conversion element.

2. The wavelength conversion device according to claim 1, further comprising a control mechanism that causes the static elimination mechanism to operate based on a change amount of a surface potential of a wavelength conversion element measured by the surface potential measurement mechanism.

3. The wavelength conversion device according to claim 1, further comprising:

a multiplexer that combines the signal light and control light; and a demultiplexer that separates the signal light that has a wavelength converted by the wavelength conversion element and the control light.

4. The wavelength conversion device according to claim 3, wherein the temperature control element is a Peltier element, the Peltier element is interposed between a first surface of a support member and a metal casing bottom surface member disposed on a bottom surface of the metal casing, and the wavelength conversion element is placed on a second surface of the support member, the second surface facing the first surface of the support member.

5. The wavelength conversion device according to claim 1, wherein the substrate is LiNbO3 (lithium niobate), KNbO3 (potassium niobate), LiTaO3 (lithium tantalate), LiNb(x)Ta(1−x)O3 (0≤x≤1) (lithium tantalate of a nonstoichiometric composition), or KTiOPO4 (potassium titanate phosphate), and further includes at least one selected from Mg (magnesium), Zn (zinc), Sc (scandium), or In (indium) therein as an additive.

6. The wavelength conversion device according to claim 1, wherein the surface potential measurement mechanism detects a voltage that is generated across a vibration electrode connected to a crystal oscillator, and a detection electrode disposed to face the vibration electrode, and measures a surface potential of the wavelength conversion element.

7. A wavelength conversion device that generates light that is different in wavelength from inputted signal light, comprising:

a wavelength conversion element that converts a wavelength of the inputted signal light; and a temperature control element for controlling a temperature of the wavelength conversion element, wherein the wavelength conversion element and the temperature control element are sealed in an interior of a metal casing, and the interior of the metal casing is filled with a dry gas including one or more selected from nitrogen, oxygen, argon, or helium, the wavelength conversion element includes an optical waveguide core and a substrate having a lower refractive index than the optical waveguide core, and a static elimination mechanism is included inside the metal casing, wherein the static elimination mechanism is an electrode needle to which a high voltage is applied or a UV-LED that irradiates the wavelength conversion element with ultraviolet light.

* * * * *